United States Patent [19]

Monier

[11] Patent Number: 5,777,916
[45] Date of Patent: Jul. 7, 1998

[54] METHOD FOR THE PRODUCTION OF AN ERROR CORRECTION PARAMETER ASSOCIATED WITH THE IMPLEMENTATION OF MODULAR OPERATIONS ACCORDING TO THE MONTGOMERY METHOD

[75] Inventor: Guy Monier, Rognac, France

[73] Assignee: SGS-Thomson Microelectronics S.A., Saint Genis, France

[21] Appl. No.: 779,525

[22] Filed: Jan. 7, 1997

[30] Foreign Application Priority Data

Jan. 18, 1996 [FR] France ................. 96 00691

[51] Int. Cl.⁶ ................. G06F 11/00; G06F 7/00
[52] U.S. Cl. ................. 364/737; 364/746.1
[58] Field of Search ................. 364/737, 746.1

[56] References Cited

U.S. PATENT DOCUMENTS 5,442,578  8/1995  Hattori ................. 364/746.1
5,592,404  1/1997  Zook ................. 364/746.1

FOREIGN PATENT DOCUMENTS 0 601 907  6/1994  European Pat. Off. ......... G06F 7/72
0 712 070  5/1996  European Pat. Off. ......... G06F 7/72

OTHER PUBLICATIONS

IEEE Journal on Selected Areas in Communications, vol. 11, No. 5, Jun. 1, 1993, pp. 761–769, Arazi, B. "Double-Precision Modular Multiplication Based on a Single-Precision Modular Multiplier and a Standard CPU".

Primary Examiner—Tan V. Mai
Attorney, Agent, or Firm—Wolf, Greenfield & Sacks, P.C.

[57] ABSTRACT

Disclosed are a method and a circuit for computing an error correction parameter associated with the Montgomery method, using an exponentiation of $2^{m*k+1}$ mod N, by an exponent equal to $k*m$(, N being a modulo, encoded on $k*m$ bits, associated with a modular operation using the Montgomery method, the Montgomery method automatically generating an error that it is necessary to correct if it is desired to perform a modular operation that is correct.

8 Claims, 2 Drawing Sheets

METHOD FOR THE PRODUCTION OF AN ERROR CORRECTION PARAMETER ASSOCIATED WITH THE IMPLEMENTATION OF MODULAR OPERATIONS ACCORDING TO THE MONTGOMERY METHOD

BACKGROUND OF THE INVENTION

1. Field of the Invention

The invention relates to a method for producing an error correction parameter associated with the implementation of modular operations according to the Montgomery method. Modular operations according to the Montgomery method enable the performance of modular computations in a finite field denoted $GF(2^n)$ (namely a Galois field with $2^n$ elements) without carrying out any division.

2. Discussion of the Related Art

Conventionally, modular operations on $GF(2^n)$ are used in cryptography for applications such as the authentication of messages, the identification of a user and the exchange of keys. Such exemplary applications are described for example in a document D1 corresponding to the French patent application published under No. 2 679 054.

There are commercially available integrated circuits dedicated to such applications. These include, for example the product referenced ST16CF54 manufactured by SGS-THOMSON MICROELECTRONICS S.A., built around an association of the type comprising a central processing unit and an arithmetic coprocessor and dedicated to the performance of modular computations. The coprocessor used enables the processing of operations of modular multiplication by using the Montgomery method. Other information on this coprocessor can be found in the European patent application No. EP-A-0 601 907A2, and is illustrated in FIG. 1 (this figure corresponds to FIG. 2 of the European patent application referred to), this dedicated circuit forming the object of the present application.

The basic operation of the modular computations according to the Montgomery method, called a $P_{field}$ operation, consists of the production, on the basis of three binary data elements A (multiplicand), B (multiplier) and N (modulo) encoded on a whole number of bits n, of a binary data element denoted $P(A, B)_N$ encoded on n bits, such that $P(A, B)_N = A*B*I \bmod N$, I being an error due to the Montgomery method. The Montgomery method uses a calculation basis of k bits and breaks down the n-bit words into m words of k bits such that $m*k \leq n > (m-1)*k$. The Montgomery method runs as follows, with i being an index varying from 0 to m–1:

$X = S_i + A_i * B$, $Y_0 = (X*J_0) \bmod 2^k$, $Z = X + (N*Y_0)$, $S_{i+1} = Z/2^k$, \being an integer division, if $S_{i+1}$ is greater than N, then N is subtracted from $S_{i+1}$ at the next iteration, $A_i$ corresponding to a word of k bits of the breakdown of A, $S_i$ corresponding to an updated result of the $P_{field}$ operation and $S_m = P(A, B)_N = A*B*I \bmod N$.

To carry out a modular multiplication $A*B \bmod N$, it is necessary to eliminate the error I. This error I is known and it is equal to $2^{-m*k}$. To eliminate it, a second $P_{field}$ operation is performed: $P(S_m, H)_N$. H being a binary data element encoded on m words of k bits and being equal to $2^{2m*k} \bmod N$.

The production of a parameter H is done conventionally by successive operations of subtraction by means of a computation coprocessor such as the one described in the document D2. A first problem is that the computation of H by means of a coprocessor requires that said processor should be capable of performing operations on words of $m*k$ bits.

If it is desired to carry out modular operations using operands with a size greater than what is managed by the coprocessor, a standard processor with 8, 16 or 32 bits, a memory and a coprocessor will be used, the coprocessor being used to perform the multiplication operations. It is then not possible to compute H in the coprocessor. The computation of H must then be done in the processor by successive subtraction operations. Since the standard processors are not optimized for this type of operation, they require a relatively large memory space to store the necessary code and they carry out the operations on large numbers far more slowly than a dedicated coprocessor. The production of a parameter of this kind is therefore not optimized.

SUMMARY OF THE INVENTION

The invention proposes a method for the computation of powers of two that can be applied to all possible cases of the computation of H. This method has the advantage of making the computation of H far speedier for large numbers.

An object of the invention therefore is a method for producing an error correction parameter used in the performance of modular computations by integrated circuits using the Montgomery method, H being the error correction parameter such that $H = 2^{(m+m'')*k} \bmod N$, N being an integer encoded on $m*k$ bits and having its least significant bit equal to non-zero, $m''*k$ being encoded on p bits, and $H(i)$ being an updated value of H such that $H(p-1) = H = 2^{(m+m'')*k} \bmod N$, said method using a modular arithmetic coprocessor, a processor and a memory, wherein the method comprises the following steps:

producing a binary data element equal to $2^{m*k+1} \bmod N$, called $H(0)$ and the storage of this data element in the memory and/or in a register of the coprocessor;

setting up a loop indexed by an index i, with i varying from 1 to p–1, and comprising the following steps:

implementing a $P_{field}(H(i-1), H(i-1))$ operation in using a multiplier of the coprocessor, and the storage of the result referenced $R(i)$ in the memory or in the register of the coprocessor; and if the bit with the place value $2^{p-i-1}$ of the data element $m*k$ is equal to 1, then performing a $P_{field}(H(i-1), H(0))$ operation by using a multiplier of the coprocessor and the storage of the result $H(i)$ in the memory or in the register of the coprocessor.

It can be seen that the $P_{field}$ operations are operations that take a great deal of time for the large numbers. However, it is possible to have a coprocessor with an internal clock frequency higher than that of a standard processor enabling time to be gained on the $P_{field}$ operations. Consequently, it is preferable in certain cases to use the method of the invention for the computation of H. Indeed, for a number encoded on $m*k$ bits, it is necessary to perform a maximum of $m''*k$ subtraction operations with the prior art or $2*\log_2(m''*k)$ $P_{field}$ operations with the invention. The greater is $m''*k$, the more useful and advantageous the invention.

Several cases are possible for a computation of $H(0)$. Thus, a choice is made either of a two's complement of N or a subtraction of N from 0, 0 being encoded on $m*k$ bits to obtain $2^{m*k} \bmod N$. Then, a leftward shift by one unit is made and a subtraction is made to obtain H(0). Furthermore, if q high-order bits of N are equal to 0, it is necessary to shift N leftwards by the number of q bits, and then carry out q+1 successive combined subtraction operations with q+1 leftward shifts by one bit, then make a rightward shift by q high-order bits equal to 0. The subtraction operations may be done in the processor or the coprocessor depending on the size of the numbers to be considered.

Another embodiment of the invention includes subdividing k*m" into two integers u and v such that u*v=m*k, v being encoded on w bits, wherein producing the binary data element equal to $2^{m^*k+1}$ mod N is replaced by producing another binary data element equal to $2^{m^*k+u}$ mod N also called H(0), and wherein the index i of the loop varies from 1 to w.

This embodiment is used to reduce the number of iterations using Pfield operations to the benefit of a few successive operations of subtraction that are less costly in terms of computation time.

BRIEF DESCRIPTION OF THE DRAWINGS

The invention will be understood more clearly and other advantages shall appear from the following description of a preferred embodiment, given by way of an indication that in no way restricts the scope of the invention, in conjunction with the appended figures, of which.

DETAILED DESCRIPTION

Figure 1:
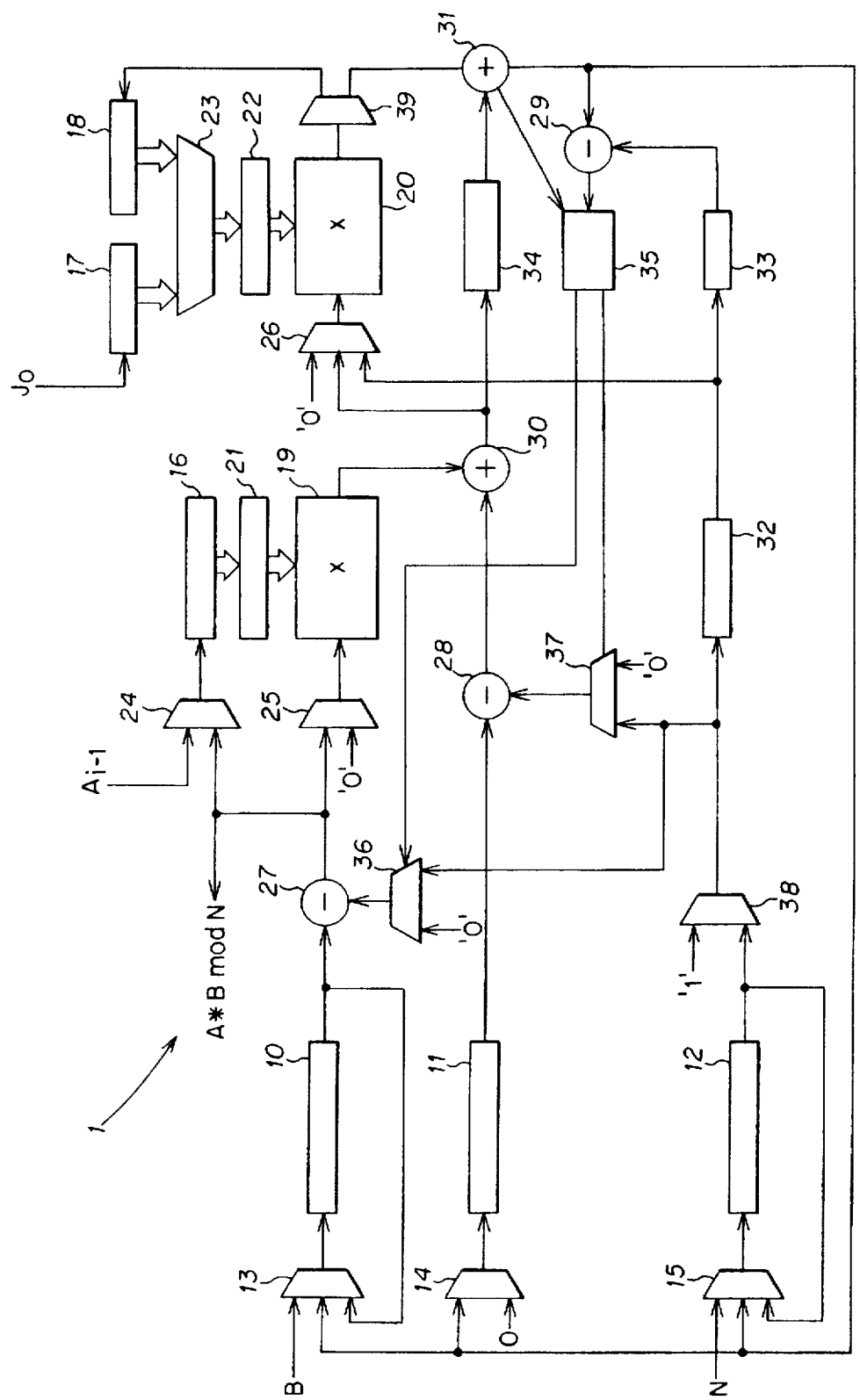
FIG. 1 is a schematic view of a prior art coprocessor enabling the implementation of the modular operations on words of m*k bits.

FIG. 1 shows a coprocessor 1 for the processing of modular operations. It comprises:

three shift registers 10, 11 and 12 with series input and output. Each of these registers has one and the same number n of cells, with n=m*k. These registers may be capable of being subdivided, for example into registers of n/2 cells and into registers of k bits for the registers 10 and 12;

multiplexers 13, 14 and 15 are placed respectively before the registers 10, 11 and 12. Multiplexers will also be placed before the subdivisions of said registers 10, 11 and 12 if these exist;

three registers 16, 17 and 18 each comprising k cells. The registers 16, 17 and 18 are registers with parallel outputs and series inputs;

two multiplication circuits 19 and 20 each comprising a series input, a parallel input and a series output. The parallel input of the multiplication circuit 19 is connected to the output of the register 16 by means of a storage flip-flop circuit 21 with k cells. The parallel input of the multiplication circuit 20 is connected to one of the outputs of the registers 17 or 18, by means of a storage flip-flop circuit 22 with k cells. This flip-flop circuit 22 is itself connected to one of the outputs of the registers 17 and 18 by means of a multiplexer with two parallel inputs and one parallel output;

multiplexers 24, 25, 37, 26, 36 and 38;

a demultiplexer 39;

series subtraction circuits 27, 28 and 29;

series addition circuits 30 and 31;

delay circuits 32, 33 and 34 to delay the propagation of binary data elements by k cycle periods;

a circuit 35 for the storage of comparison results.

Figure 2:
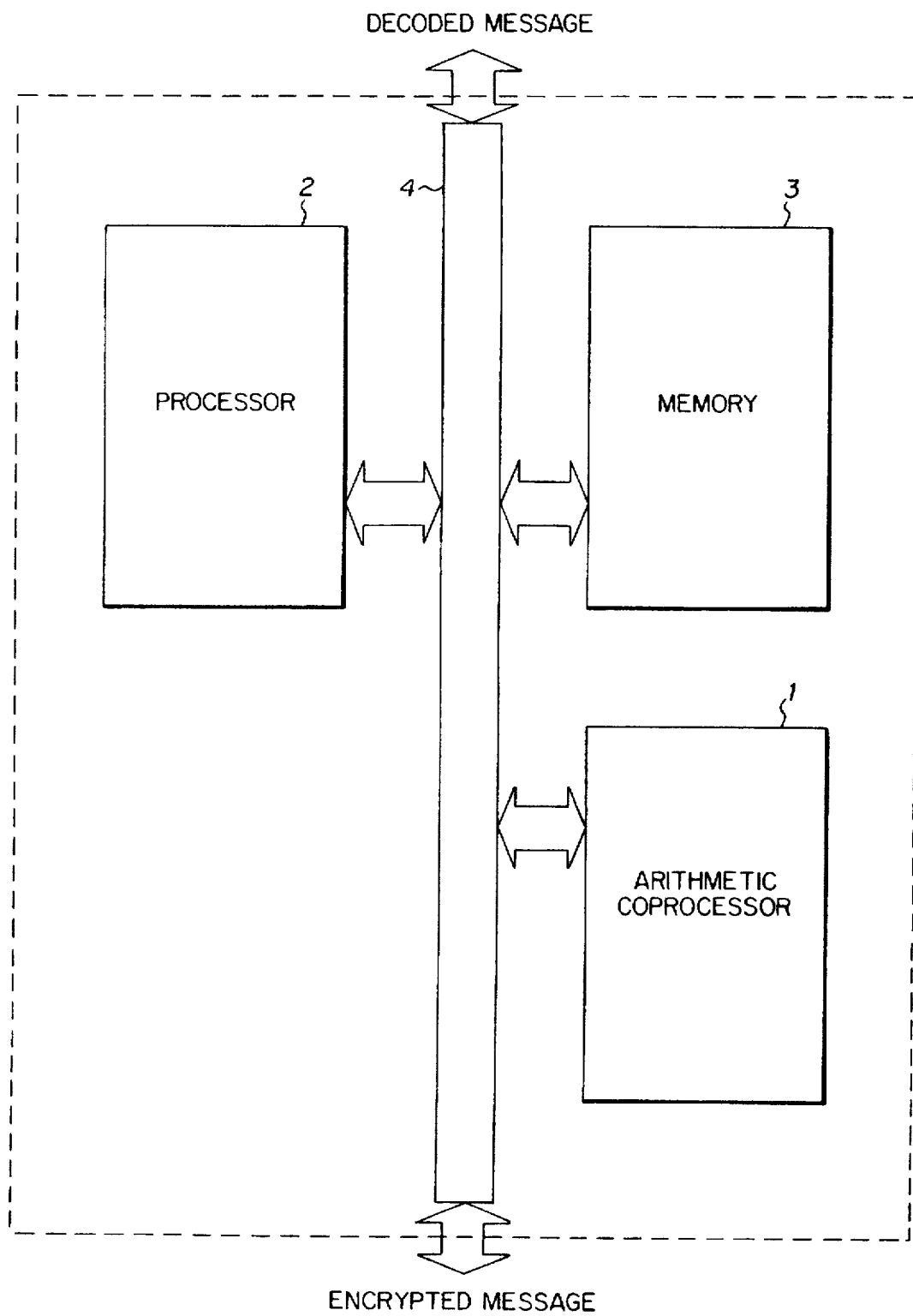
FIG. 2 is a schematic view of an encryption circuit implementing modular operations on words with sizes of m'*k' bits.

For greater detail, reference may be made to the document D2 and especially to FIGS. 2 and 3, and to the extracts from the description pertaining thereto: page 15, line 54 to page 16, line 13, and page 17, line 50 to page 18, line 55.

The coprocessor 1 can perform computations of modular operations on numbers of m*k bits, as described in the document D2. However, it is also possible to make it carry out standard operations of multiplication A*B on numbers with sizes going up to m*k bits in performing the following procedure:

E1: resetting:
loading in the register 17 of k times 0,
loading in the register 10 of B,
loading in the registers 11 and 12 of m*k times 0,
loading in the register 16 of the word $A_0$ of k bits of A,
resetting of the multiplier 19,
resetting of the addition circuits and of the subtraction circuits 28, 30, 31;

E2: the setting up of a loop indexed by an index i, with i varying from 1 to m:
the loading of the contents of the register 16 into the flip-flop circuit 21,
the multiplication of $A_{i-1}$ by B and the addition of the contents of the register 11 with the product by a simultaneous rightward shift of the registers 10 and 11,
the storage of the k low-order bits of the result in the register 12 by a rightward shift by k bits,
the storage of the m*k high-order bits of the result in the register 11,
the loading of the word Ai in the register 16 during the running of the other steps.

At the end of a method of this kind, there is therefore the least significant value of the result in the register 12 and the most significant value of the result in the register 11. It can be seen by those skilled in the art that it is necessary to add an output terminal to the register 12 to enable the output of the least significant value of the result.

It can also be seen by those skilled in the art that with this same method it is possible to carry out the multiplication of a number B encoded on m*k bits by a number A encoded on m"*k bits with m" being any integer. For this purpose, the loop of the step E2 is made with an index i varying from 1 to m". At every m iterations, the contents of the register 12 are brought out by an output terminal.

It is also possible to obtain the square of the numbers encoded on m*k bits by means of the register 10 without external loading of the register 16. Indeed, it is enough to load the k bits needed for the following iteration, in the register 16, during the iteration in progress when said bits come out of the register 10.

To enable the performance of modular computations according to the Montgomery method, the structure of FIG. 2 is used. This FIG. 2 shows an encryption circuit comprising an arithmetic coprocessor 1, a processor 2, a memory 3 and a communications bus 4 that enables the connection of the above-mentioned elements 1, 2 and 3 together. The memory has the role of storing binary data elements of different formats. The processor 2 has the role of managing the information exchanges between the memory 3, the coprocessor 1 and the exterior of this encryption circuit. The coprocessor 1 may be, for example, the same as that of FIG. 1 after having undergone a few slight modifications to perform the simple multiplication operations described here above.

With the encryption circuit of FIG. 1, it is possible to carry out operations on words encoded on m'*k' bits, k' being equal to j*k, j possibly varying from 1 to m and m' being any integer that undergoes a limitation due to the size of the memory, this being a size that will be set by those skilled in the art.

In one example, the algorithm used for the computation of a $P_{field}(A, B)_N = S$ operation makes use of the following variables:

A and B are two integers encoded on n' bits and broken down into m' words of k' bits respectively referenced $A_0$ to $A_{m'-1}$ and $B_0$ to $B_{m'-1}$.

N is an even-order integer encoded on n' bits and represented on m' words of k' bits referenced $N_0$ to $N_{m'-1}$.

S(i) is an integer encoded on (m'*k') bits representing an updated value of the result S during an iteration i.

X and Z are two integers encoded on ((m'+1)*k') bits.

$Y_0$ is an integer encoded on k' bits.

$J_0$ is an integer encoded on k' bits such that $((J_0*N_0)+1) \mod 2^{k'} = 0$.

The mathematical algorithm that is used is the following:

the zero setting of S(0), the setting up of a loop indexed by an index i, with i varying from i to m':

B1: the computation of $X = S(i-1)+(B*A_{i-1})$,

B2: the computation of $Y = (X*J_0) \mod 2^{k'}$, where the operation mod $2^{k'}$ corresponds only to a truncation, B3: the computation of $Z = X+(Y*N)$, B4: the computation of $S(i) = Z\backslash 2^{k'}$, where the symbol represents an integer division, it is actually a truncation of k' bits, B5: if S(i) is greater than N, then N is subtracted from S(i).

it is possible to retrieve the result $S = S(m') = P_{field}(A, B)_N = A*B*2^{-m'*k'} \mod N$.

Naturally, if k'*m'≤k*m, the operations $P_{field}$ will preferably be done within the coprocessor optimally, in taking k'=k, for example as described in the document D2.

If, on the contrary, k'*m'>k*m, the $P_{field}$ operations will be done with the processor 2, the operations of multiplication being done by means of the coprocessor 1.

Whatever the size k'*m' of the operands, it is necessary to produce an error correction parameter $H = 2^{2*k'*m'} \mod N$ if it is desired to carry out a modular multiplication, with A and B having the size of N. In fact, other cases may arise depending on the mode of performance of a $P_{field}$ operation, if A is encoded on ka*m bits, B encoded on kb*m' bits and N encoded on k'*m' bits. It is possible to have parameters H of different shapes that take account of the optimization of the modular multiplication. Thus, it is possible to have $H = 2^{k'*(ma+m')}$, or $2^{k'*(mb+m')}$, or $2^{k'*(ma+mb)}$. In fact, the choice is reduced to $H = 2^{k'*(m''+m')}$ in all cases with m"=ma, or mb, or ma+mb−m'. Thus defined, m" may be negative. In practice it is always positive.

In the present example, this error correction parameter H is used to eliminate the error due to the Montgomery method which is equal to $2^{-m'*k'}$. To carry out a multiplication, a first $P_{field}$ operation is performed with the two operands of the multiplication to be made, and then a second $P_{field}$ operation is performed with the result of the first $P_{field}$ operation and the error correction parameter H.

To produce the correction parameter H when m'*k'≤m*k, the document D2 uses a method of successive operations of subtraction that can be achieved integrally in the coprocessor 1.

If m'*k'>m*k, then the computation of H can no longer be done totally in the coprocessor 1. If it is desired to carry out a method using successive operations of subtraction, this method must be done by the processor 2 which will use a computation program. A computation program such as this amounts to making m"*k' iterations each comprising, in the worst possible case of computation: a subtraction on m'*k' bits, a 1-bit shift on a word of m'*k' bits, and a comparison on two words of m'*k bits. Thus, the computation time of H is proportional to (m'*k')*(m"*k').

In order to reduce this period for large-sized operands, the invention proposes a different method of computation that can be applied whatever the size of the operands. The method proposed is particularly worthwhile for m'*k' and m"*k' having very big values.

The method of the invention uses a circuit as described in FIG. 2. This method requires the encoding of m"*k' on p bits and comprises the following steps:

the production of a binary data element equal to $2^{m'*k'+1} \mod N$, called H(0) and the storage of this data element in the memory 3;

the setting up of a loop indexed by an index i, with i varying form 1 to p−1, comprising the following steps:
the implementation of a $P_{field}$(H(i−1), H(i−1)) operation and the storage of the result referenced R(i),
if the bit with the place value $2^{p-i-1}$ of m*k is equal to 1, then the performance of a $P_{field}$(H(i−1), H(0)) operation and storage of the result H(i).

The loop made above amounts to making a modular exponentiation, according to the Montgomery method without error correction, of H(0) by m"*k'. Thus, the loop carries out $\log_2$ (m"*k') iterations (the result being truncated), each iteration being proportional to m'*k'. Naturally, the coefficient of proportionality of an iteration of the method is greater than the coefficient of proportionality of an iteration of the prior art.

Whatever the size of m'*k', the multiplier 19 of the coprocessor 1 will be called into use during the $P_{field}$ operations. The results R(i) and H(i) may be stored in the memory 3, but it is preferable to store them in the register 10 if m'*k'≤m*k.

The binary data element H(0) is stored in the memory. However, if this method is used for sizes of operands smaller than m*k bits, this data element is also stored in the register 10 of the coprocessor 1.

The production of this data element $H(0) = 2^{m'*k'+1} \mod N$ can be done differently depending on the cases that arise.

If N has its most significant bit equal to 1, then there are two possibilities for producing 2m'*k':

either the two's complement of N is taken, or the operation 0−N is performed.

These two possibilities are equivalent. However, the second possibility will be preferred if m'*k'≤m*k, the operation being wired on the coprocessor 1. The choice of either of the possibilities must be made as a function either of speed of execution or of the simplicity of layout depending on the constraints to which those skilled in the art are subjected in setting up the system.

Then, a leftward shift by one unit is performed followed by a subtraction of N to obtain H(0).

If q high-order bits of N are at 0, then the computation of H(0) is done by returning to the previous case. That is to say, by performing the following operations:

a leftward shift of N by q bits giving N', the q low-order bits of N' being equal to 0;

the production of a data element H'(0) by the taking of the two's complement of N' (or by the subtraction of N from 0);

the setting up of a loop indexed by an index j, with j varying from 1 to q, comprising the following steps:
  a leftward shift by 1 bit, the result being called H'(j), if H'(j) is greater than N', then N' is subtracted from H'(j);
a rightward shift of H'(q) by q bits to obtain H(0).

Clearly, those skilled in the art will understand that the leftward shifts correspond to operations of multiplication by a power of two. Those skilled in the art will also understand that these leftward shifts may be fictitious, i.e. they may be done by loading zeros in low-order bits instead of the data element and thus shifting the loading of the data element. It is also possible that the subtraction of N' from H'(j) is done in series. In this case, the leftward shift actually corresponds to a rightward shift that is not performed.

In practice, when N is encoded on m'*k' bits, it is rare for N to have more than 3 or 4 high-order bits at 0. For m'*k' as a high value, it is estimated that the computation of H(0) is negligible before an iteration of the loop of the computation of H using at least one $P_{field}$ operation. Thus, it is assumed that the production of H uses a time proportional to $\log_2$ (m'*k') *(m'*k'). It can therefore clearly be seen by those skilled in the art that the computation of H for operands encoded on a large number of bits is faster than it is for a method using successive operations of subtraction.

Another embodiment of this method includes breaking down m"*k' into a product of two terms u*v in order to carry out u iterations by successive operations of subtraction and $\log_2(v)$ iterations by exponentiation. For this purpose, the following steps are performed in taking u and v as two integers such that u*v=m'*k" and v being encoded on w bits:
  the production of a binary data element equal to $2^{m'*k'+u}$ mod N, called H(0) and the storage of this data element;
  the setting up of a loop indexed by an index i, with i varying from 1 to w−1, and comprising the following steps:
    the implementation of a $P_{field}$(H(i−1), H(i−1)) and the storage of the result referenced R(i).
    if the bit with the place value $2^{w-i-1}$ of the data element v is equal to 1, then performance of a $P_{field}$(H(i−1), H(0)) and storage of the result H(i).

The computation of H(0) equal to $2^{m'*k'+u}$ mod N is done in the following steps with q high-order bits of N being at 0:
  a leftward shift of N by q bits giving N', the q low-order bits of N' being equal to 0;
  the production of a data element H'(0) by the taking of the two's complement of N' (or by the subtraction of N from 0);
  the setting up of a loop indexed by an index j, with j varying from 1 to q+u, comprising the following steps:
    a leftward shift by 1 bit, the result being called H'(j), if H'(j) is greater than N', then N' is subtracted from H'(j);
  a rightward shift of H'(q) by q bits to obtain H(0).

Of course, by analogy with the computation by simple exponentiation, if the most significant bit of N is equal to 1, then the steps pertaining to the q high-order bits at 0 are unnecessary.

Again by analogy with this method of simple exponentiation, it is possible, for the storage of the results, to use the memory as well as the register 10. Similarly, all the operations of multiplication of the $P_{field}$ operations are done in the coprocessor.

An improvement of this kind reduces the modular exponentiation by a few iterations to the benefit of a few iterations of successive subtraction operations that are less costly in terms of performance time.

As a numerical example, with the following values: k'=512=m*k, m'=m"=8, and q=0, we have approximately the following results in terms of time:
  by successive subtraction, a time of the order of 16 million clock cycle periods,
  by simple exponentiation, a time of the order of 9 million clock cycle periods,
  by combining the two methods in taking u=8, a time of the order of 7 million clock cycle periods.

Those skilled in the art will note that it is not always useful to take k'=k*m and will be able, at leisure, to vary the different parameters that may be chosen without departing from the general idea of the invention.

The invention enables the processing of very large numbers without in any way increasing the number of processing circuits. In a chip card, the size of the integrated circuit is very small. However, certain chip cards need large memories for different functions. The invention can therefore use a memory shared with other elements of the chip card. The solution provided by the invention is therefore especially suited to integration on a chip card.

Since the invention uses a large memory, it is possible to envisage the use of this memory also for other applications.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for producing an error correction parameter used in the performance of modular computations by integrated circuits using the Montgomery method, H being the error correction parameter such that $H=2^{(m+m")*k}$ mod N, N being an integer encoded on m*k bits and having its least significant bit equal to non-zero, m"*k being encoded on p bits, and H(i) being an updated value of H such that $H(p-1)=H=2^{(m+m")*k}$ mod N, said method using a modular arithmetic coprocessor, a processor and a memory, wherein the method comprises the following steps:
  producing a binary data element equal to $2^{m*k+1}$ mod N, called H(0) and the storage of this data element in the memory and/or in a register of the coprocessor;
  setting up a loop indexed by an index i, with i varying from 1 to p−1, and comprising the following steps:
  implementing a $P_{field}$(H(i−1), H(i−1)) operation in using a multiplier of the coprocessor, and the storage of the result referenced R(i) in the memory or in the register of the coprocessor,
  if the bit with the place value $2^{p-i-1}$ of the data element m*k is equal to 1, then performing a $P_{field}$(H(i−1), H(0)) operation by using a multiplier of the coprocessor and the storage of the result H(i) in the memory or in the register of the coprocessor.

2. A method according to claim 1, wherein the step of producing a binary data element equal to $2^{m*k+1}$ mod N comprises the following steps:
  resetting a data element, encoded on m*k bits, at 0 in the memory or in the register of the coprocessor;
  carrying out a subtraction of 0−N in the processor or in the coprocessor;
  leftward shifting by one bit of this first result;

subtracting N, in the processor or in the coprocessor, from the shifted result if it is greater than N; and storing the m*k low-order bits of H(0) in the memory or in the register of the coprocessor.

3. A method according to claim 1, wherein the step of producing a binary data element equal to $2^{m*k+1}$ mod N comprises the following steps:

producing the two's complement of N,- the shifting of the complement leftward by one bit;

subtracting N, in the processor or in the coprocessor, from the shifted complement if it is greater than N; and storing the m*k least significant bits of H(0), in the memory or in the register of the coprocessor.

4. A method according to claim 1, wherein the step of producing a binary data element equal to $2^{m*k+1}$ mod N is done as follows when N has q most significant bits at zero:

resetting a data element at 0, encoded on m*k bits, in the memory or in the register of the coprocessor;

leftward shifting by q bits of N giving N', the q low-order bits of N' being equal to 0;

performing a subtraction 0–N' in the processor or in the coprocessor and storing the m*k low-order bits in H'(0);

setting up a loop indexed by an index j, with j varying from 1 to q+1, comprising the following steps:

leftward shifting by 1 bit, the result being called H'(j);

if H'(j) is greater than N', then N' is subtracted from H'(j) in the processor or in the coprocessor; and rightward shifting of H'(q+1) by q bits to obtain H(0).

5. A method according to claim 1, wherein the steps of producing a binary data element equal to $2^{m*k+1}$ mod N is done also when N has q most significant bits at zero:

leftward shifting by q bits of N giving N', the q low-order bits of n' being equal to 0;

producing a data element H'(0) by the obtaining of the two's complement of N';

setting up a loop indexed by an index j, with j varying from 1 to q+1, comprising the following steps:

leftward shifting by 1 bit, the result being called H'(j);

if H'(j) is greater than N', then N' is subtracted from H'(j) in the processor or in the coprocessor; and rightward shifting of H'(q+1) by q bits to obtain H(0).

6. A method according to claim 1, wherein there are two integers u and v such that u*v=m*k, v being encoded on w bits, and wherein the step of producing the binary data element equal to $2^{m*k+1}$ mod N is replaced by a step of producing another binary data element equal to $2^{m*k+u}$ mod N also called H(0), and wherein the index i of the loop varies from 1 to w.

7. A method according to claim 6, wherein the step of producing of the binary data element called H(0) comprises the following steps, N' being equal to N:

producing a data element H'(0) by the obtaining of the two's complement of N' or by the subtraction of N from 0 in the processor or in the coprocessor;

setting up a loop indexed by an index j, with j varying from 1 to u, comprising the following step:

leftward shifting by 1 bit, the result being called H'(j).

if H'(j) is greater than N', then N' is subtracted from H'(j).

8. A method according to claim 7, wherein there are q high-order bits of N that are equal to 0, and wherein the following steps are added to the step of producing binary data element H(0) among the already existing steps:

leftward shifting by q bits of N giving N', the q low-order bits of N' being equal to 0;

setting up a loop indexed by an index j, with j varying from 1 to q, comprising the following steps:

leftward shifting by 1 bit, the result being called H'(j+u);

if H'(j+u) is greater than N', then N' is subtracted from H'(j) in the processor or in the coprocessor; and rightward shifting of H'(q+u) by q bits to obtain H(0).

\* \* \* \* \*